United States Patent [19]

Schrauf et al.

[11] 4,346,913
[45] Aug. 31, 1982

[54] FALSE RELEASE REGISTERING CIRCUIT FOR COLLISION PROTECTIVE DEVICES

[75] Inventors: Werner Schrauf, Schwieberdingen; Peter Werner, Wiernsheim-Iptingen; Luer Luetkens, Reutlingen; Hans-Heinrich Maue, Asperg; Wadym Suchowerskyj, Schwieberdingen, all of Fed. Rep. of Germany

[73] Assignee: Robert Bosch GmbH, Stuttgart, Fed. Rep. of Germany

[21] Appl. No.: 158,693

[22] Filed: Jun. 12, 1980

[30] Foreign Application Priority Data

Jun. 15, 1979 [DE] Fed. Rep. of Germany ....... 2924252

[51] Int. Cl.$^3$ .............................................. B60R 21/08
[52] U.S. Cl. ................................. 280/735; 180/282; 340/52 H
[58] Field of Search ............. 340/52 H, 61, 52 R, 340/669; 180/282, 283; 280/735, 734

[56] References Cited

U.S. PATENT DOCUMENTS

| | | | |
|---|---|---|---|
| 2,823,367 | 2/1958 | Huron | 340/52 H |
| 3,890,594 | 6/1975 | Hosaka et al. | 340/52 H |
| 3,931,527 | 1/1976 | Oishi et al. | 340/52 H X |
| 3,949,357 | 4/1976 | Hosaka | 340/52 H |
| 3,964,016 | 6/1976 | Yamada et al. | 340/52 H |
| 4,243,971 | 1/1981 | Suchowerskyj et al. | 340/52 H |

Primary Examiner—Robert R. Song
Assistant Examiner—Michael Mar
Attorney, Agent, or Firm—Frishauf, Holtz, Goodman & Woodward

[57] ABSTRACT

A first deceleration sensor operates switches for energizing the release element of airbags in a vehicle, typically glow wires that will set off an explosive filling of the respective airbag. Connected through diodes to the various airbags is a circuit in parallel with the release elements of all of them which contains a fuse 49 in series with a normally closed switch 50, which last is controlled by a second deceleration sensor 52. If a short circuit or any malfunction causes any one or more of the airbags to release, since the sensor controlling the normally closed switch does not operate, the fuse blows to register a false release. The sensor controlling the normally closed switch may also control a normally open switch in series with all of the switches controlling individual airbags, so that both sensors must operate to release an airbag, and is economically combined into a mercury switch unit in which rapid deceleration moves the mercury to break one circuit and make another circuit, as distinguished from the first-mentioned sensor which operates switching transistors.

13 Claims, 5 Drawing Figures

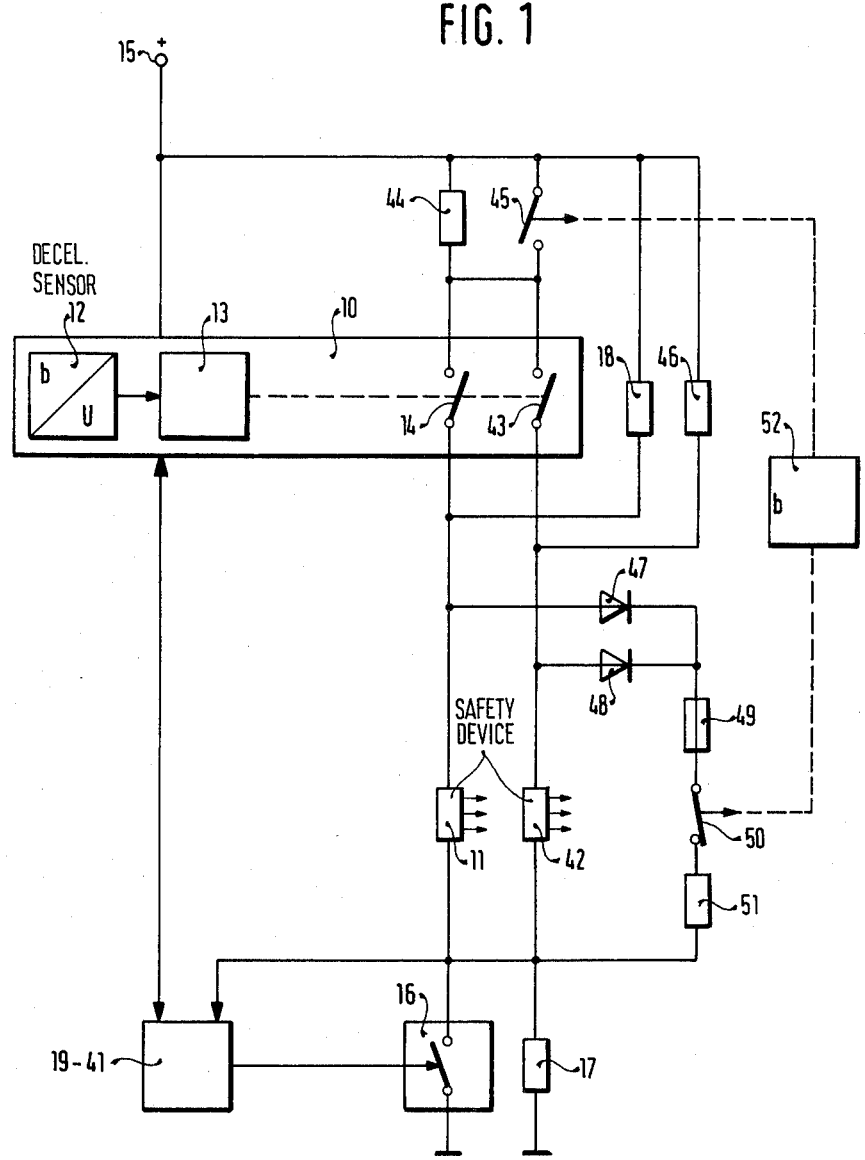

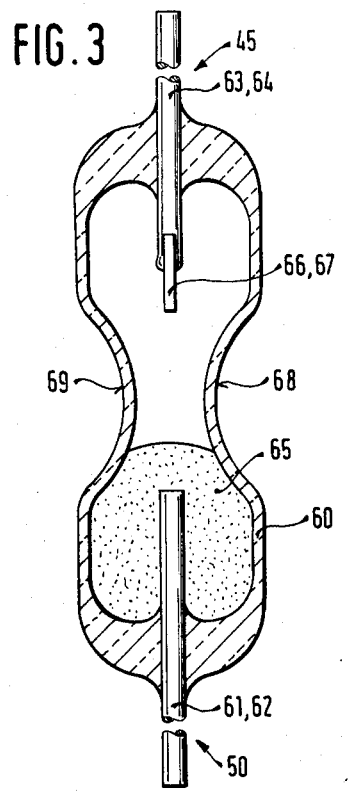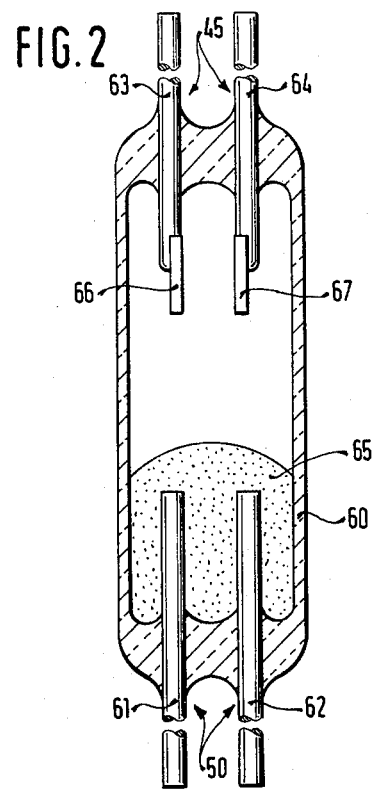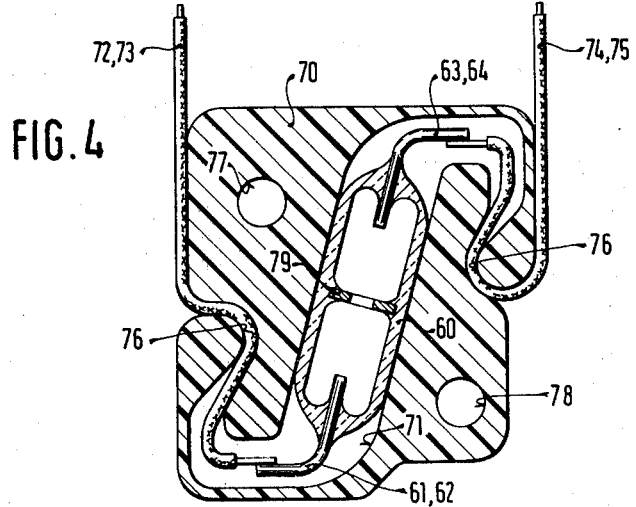

FALSE RELEASE REGISTERING CIRCUIT FOR COLLISION PROTECTIVE DEVICES

The present invention concerns a circuit for detecting and registering false release of a protective shock absorbing device installed in a vehicle and designed to be released by the shock of a collision. Shock absorbing protective devices of the airbag type are described in U.S. Pat. Nos. 3,622,974 and 3,874,695. These are arranged to be released by the sudden deceleration of the vehicle resulting from an accident or similar emergency and to present themselves in inflated condition between the driver or passenger and the dashboard.

Circuits have been provided for such devices for increasing the margin of safety against fast release by providing two switches controlled by deceleration sensors connected in series with the safety device, so that the release of the safety device is not possible unless both sensors respond to the deceleration.

In an investigation of an accident in which the protective safety device was released, the question can arise whether the safety device was released as the result of a collision or whether the collision occurred as the result of a false release of the safety device. Continued approval of a particular kind of safety device requires information on such questions, as does also any question of responsibility for a particular incident.

U.S. Pat. No. 4,060,004 discloses an arrangement for storing information regarding false release of a safety device. In this case, an expensive additional deceleration sensor is necessary, which appreciably increases the expense.

SUMMARY OF THE INVENTION

It is an object of the invention to provide a system for detecting when a false release of a safety device has taken place which will require little or no addition of equipment to the safety device release system.

Briefly, parallel to one or more safety devices, there is provided a series connection of a storage register device responding to a predetermined level of current, which device may be a simple fuse, and a normally closed switch that opens in response to the operation of a deceleration sensor, which also controls a second switch which is connected in series to the safety device or devices. The sensor in operating first opens the normally closed switch and then actuates the second switch which is preferably a normally opened switch which closes when it operates.

It is particularly convenient to combine the sensor, the normally opened switch and the normally closed switch into a combined unit in the nature of a mercury-contact device. Such a device, preferably, has a tubular envelope with a pair of contacts passing through each of the closed ends thereof, and arranged so that a quantity of mercury that normally bridges one set of contacts will be projected to the other end of the tube where it will close at the other set of contacts when the vehicle decelerates at more than a predetermined rate. It may be desirable to pinch the mid-portion of the tubular envelope and/or to provide a pierced diaphragm in the mid-portion. Other details of the invention are described in the more complete description below.

The circuit of the invention has the advantage that by checking the storage device, such as a fuse, provided in the circuit, it can be determined whether there was a false release of the protective device or a proper release thereof. The manufacturer of the system thus has the possibility of checking back to assure that his system functions properly.

It is particularly useful to have the deceleration sensor that controls the normally closed switch relating to the storage device also control an additional switch provided in series with the safety device (which may already have one switch in series with it controlled by another deceleration sensor). With the combination component combining the sensor and normally open and normally closed switches, it is possible to provide appreciable increase of the margin of safety of the release system at a very slight increase of cost.

A testing circuit can also conveniently be provided in the circuit of the present invention.

BRIEF DESCRIPTION OF THE DRAWINGS

The invention is further described by way of illustrative example with reference to the annexed drawings, in which:

FIG. 1 is a circuit diagram of a system for controllably releasing two safety devices and having a storage device for registering false releases;

FIG. 2 is a longitudinal section of the working portion of a combined normally closed switch, normally open switch and deceleration sensor;

FIG. 3 is a section in the plane at right angles to that of FIG. 2 showing the device illustrated in FIG. 2;

FIG. 4 is a median plane sectional view of a component similar to that shown in FIGS. 2 and 3 embedded in a synthetic resin casing.

DESCRIPTION OF THE PREFERRED EMBODIMENTS

Figure 5:
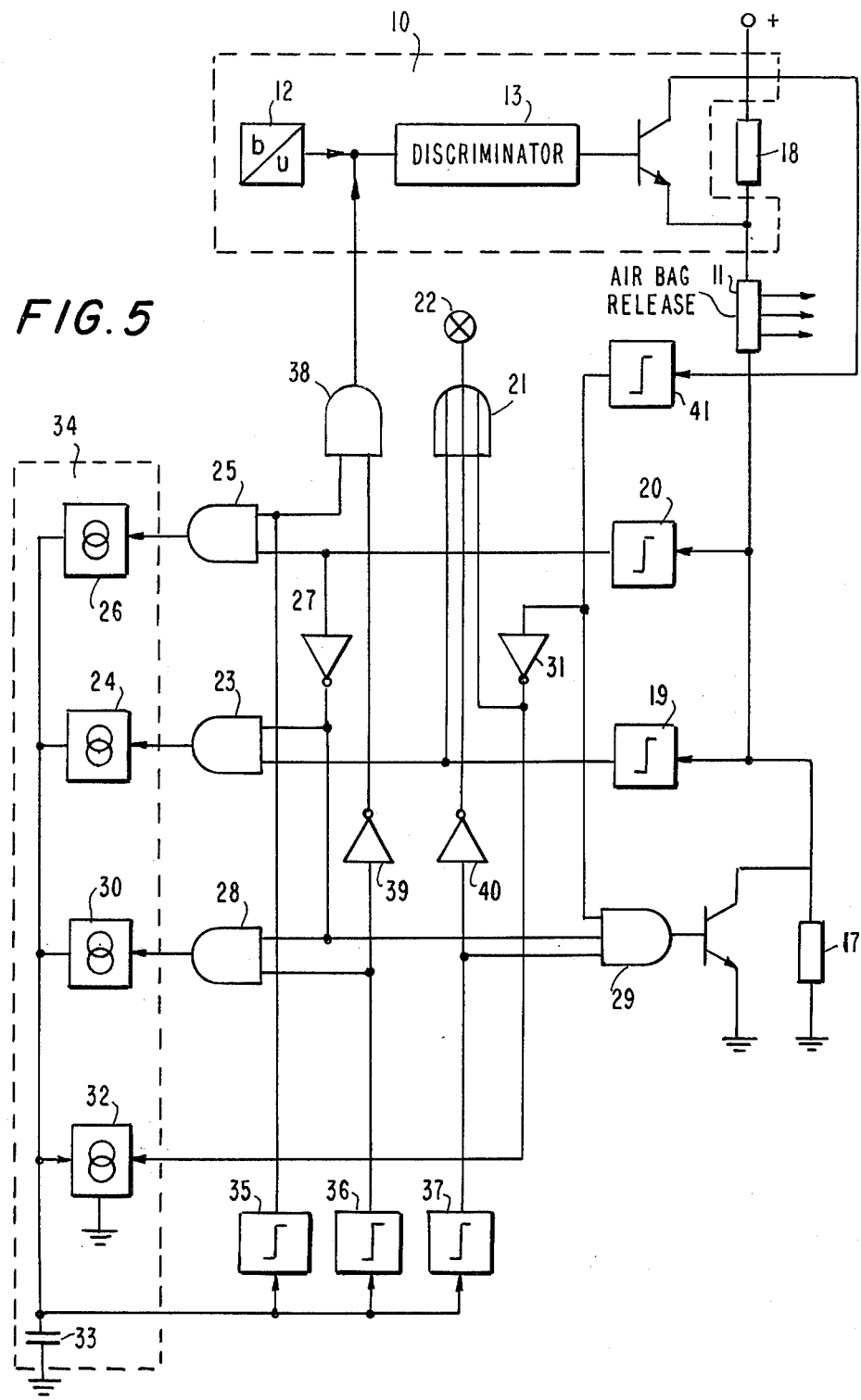
FIG. 5 is a diagram of a test circuit that may be incorporated into the circuit of the present invention.

The circuit diagram of FIG. 1 shows in a simplified block diagram a conventional release circuit 10 for two shock-absorbing protective devices 11,42 of the airbag type under control of a deceleration sensor 12 at the output of which is produced a signal that is either proportional to deceleration or else is produced only when a particular level of deceleration is exceeded. The output signal of the sensor 12 is provided to an electronic circuit 13 in which the signal is checked to determine whether it results from an imminent accident (i.e., running into an obstacle) or some other kind of acceleration effects are responsible (as, for example, somewhat heavy braking or the effect of a stone fragment). Such an evaluation circuit is known, for example, from U.S. Pat. No. 3,911,391.

If an accident situation is recognized by the circuit 13, a signal is then produced that closes the switches 14,43 that are preferably constituted by transistors. One terminal of the switch 14 is connected in series with one of the protective devices 11 and the contacts of a further switch 16 and thereafter ultimately to ground, which is to say to the vehicle chassis. A resistor 17 is connected in parallel to the contacts of the switch 16. The connection point of the switch 16 with the resistor 17 is further connected to another protective device 42 and through it to one terminal of the switch 43.

The portion of the protective devices 11,42 which are connected in circuit as shown in FIG. 1 may, for example, consist of a glow-wire by which an explosive chemical mixture can be detonated so as to fill an airbag explosively immediately afterwards. The two airbags, when thus filled, spread out in front of the driver and front-seat passenger in the vehicle and prevent them from being thrown against the dashboard and thereby suffering injury.

The second terminals, connected together in FIG. 1, of the switches 14 and 43 are connected through a parallel combination of a resistor 44 and the contacts of still another switch 45 to a terminal 15 that itself is connected with the positive pole of a voltage source. The terminal 15 also supplies power to the release circuit 10 and there are two resistors 18 and 46 connected between the terminal 15 and the respective protective devices 11 and 42.

A test circuit 19-14, indicated simply as a circuit block in FIG. 1, is connected between the release circuit 10 on the one hand and the common point of connection of the protective devices 11 and 42 on the other hand. The test circuit 19-14 controls the switch 16.

The respective connections of the switches 14 and 43 with the protective devices 11 and 42 are each connected over a diode 47,48, to a storage register 49 that is preferably provided as a fuse that registers a signal by melting. The switching positions of the switches 50 and 45 which are respectively constituted as normally closed and normally open switches (i.e., as circuit opening and circuit closing switches, respectively) are mechanically coupled together and controlled by a deceleration sensor 52. The release circuit 10 and the testing circuit 19-41 are of the kind disclosed in the copending application of Wadym Suchowerskyj et al, U.S. Ser. No. 082,572, filed Oct. 9, 1979, now U.S. Pat. No. 4,243,971 owned by the assignee of this application and already published in West German (OS) No. 2 851 333. The test circuit is shown here in FIG. 5. The corresponding components carry the same reference numerals, both in the present FIG. 5 and in FIG. 1 of the aforesaid copending application.

The testing circuit 19-41 performs a function of starting a test program every time the supply voltage is turned on to assure the readiness of the release circuit 10. In particular, the switch 16 is opened during every operation of the test program whenever the switch 14 is closed, in order to prevent a release of the protective device 11 during the test program. The current through the resistors 18 and 17 is not sufficient to release the protective device 11. A more detailed description of the test circuit 19-41 can be found in the aforesaid copending application. After the termination of the test program, the switch 16 is reclosed.

The components 42,43,46, connected in the same manner as the components 11,14 and 18, essentially in parallel as a combination, provide a second and identical circuit for the release of a second airbag. The manner of operation with respect to the test program is identical. Still other protective devices, not shown in the drawing, could be similarly provided for operation in parallel with the protective devices 11,42.

The mode of operation of the storage register 49 consists in that when one of the switches 14,43 closes without the occurrence of a switchover of the switches 45,50 by the deceleration sensor 52, a current flows through the resistor 44, one or both of the switches 14 and 43, one or both of the diodes 47–48, the storage register 49, the switch 50, the register 51 and the switch 16. The resistors are so dimensioned that the current is sufficient for a registration in the storage register 49, but is nevertheless insufficient for release of one of the protective devices 11,42. This means, for example, that when the storage register 49 is constituted as a fuse, this fuse burns out. A burned-out fuse 49, therefore, signifies a false release, which can either be verified later by inspecting the condition of the fuse or can be indicated immediately by a separate indicating arrangement not shown in the drawing and not further described here because such indicating arrangements for burned-out fuses are well known.

In the case of normal functioning of the release circuit, when there is a deceleration, the sensor 52 must switch over both the switches 50 and 45 before the operation of the release circuit 10, thus closing the switch 45 and opening the switch 50. If this is the case, when the switches 14 and 43 close, the corresponding protective devices 11,42 are released, while at the same time the storage register 49 remains intact because the switch 50 has been opened. This provision is particularly well assured if the switch 50 is made to open just before the closing of the switch 45.

Accordingly, if after an accident an intact storage register 49 is found, that is proof that a normal release has taken place as a consequence of the operation of both deceleration sensors 12 and 52. If, on the contrary, the fuse 49 is burnt out, this is proof that the flow of current took place through the protective devices 11 and 42 without the deceleration sensor 52 having operated. Such a false release, for example, resulting from a short circuit, is never quite out of the question.

In a simpler version of the circuit described in FIG. 1, the components 44 and 45 could be left out. In such a case, there would be lost the higher margin of safety of release resulting from the series connection of two release switches, but the indication of a false release of the registering device 49 would still be retained because, in this case also, the deceleration sensor 52 would have to operate in order to prevent a registration (burning out of the fuse) in the register 49.

The parallel connection of the components 44 and 45 can, of course, be provided in another place in the release circuit of the protective devices 11 and 42.

Finally, in a simplified version of the circuit of the invention, the test circuit 19-41 could also be dispensed with, in which case the components 18,46, 16 and 17 would likewise be omitted.

An example with specific electrical dimensions is provided below:
Supply voltage: 12 volts
Release current for protective devices 11,42: 250 mA
Release current for storage register 49: 50 mA
Resistors: R11, R42: 2 ohms; R17: 500 ohms; R18, R 46: 1000 ohms, R44: 100 ohms; R49: 4 ohms; R51: 3 ohms.

FIGS. 2 and 3 show the form of construction of the switches 50 and 45 and of the deceleration sensor 52 in a single unitary component.

At the lower end of a closed cylindrical glass tube 60 are the tube switch contacts 61,62 of the normally closed switch 50 which are supported by having the tube ends melted around them where they pass into the tube. At the upper end of the glass tube 60, there are likewise the tube switch contacts 63,64 of the normally open switch 45. A quantity of mercury 65 is located in the tube 60 which connects the tube switch contacts 61 and 62 electrically together in the quiescent position of the device. In the case of deceleration (or in some equipment, in the case of acceleration), the quicksilver 65 moves under the influence of inertial forces to the other end of the glass tube, which is mounted obliquely (see FIG. 4), so that the inertial forces must overcome the forces of gravity, thus assuring that only a relatively high rate of deceleration will cause the device to operate. In such a manner, the contacts 61,62 are electrically separated and the contacts 63 and 64 are electrically connected together.

For better wetting of the contacts 63 and 64 with quicksilver, these contacts are provided with platinum electrodes 66,67. These platinum electrodes can, of course also be provided for the contacts 61 and 62. It is also possible to provide a platinum contact surface in some other way, for example, by applying a platinum layer on the ends of the rods which provide the switch elements (which may be referred to as electrodes, also). By suitable choice of the amount of mercury, it can be assured that the switch 50 opens before the switch 45 closes.

In FIG. 3, in which a side view of the glass tube 60 is shown, two indentations 68 and 69 in the wall of the glass tube are shown. These serve to modify the deceleration threshold at which the switch operates. Instead of two such indentations, of course, only a single indentation could be provided, or the indentations could be entirely omitted. The deceleration threshold can also be influenced by the use of mercury alloys (amalgams), modification of the internal glass surface of the tube (for example, roughening), or by other kinds of variations in shape of the glass body. Thus, for example, the cylindrical glass body could be subjected to one or more bends in manufacture.

Such a mercury switch is particularly suitable for use as a deceleration sensor because it lends itself so well to combination of the sensor with two or more switches in a single component and especially because of the insensitivity of the device to corrosion, the disappearance of friction problems, the making of contacts without bounce problems, low costs and adjustability of the acceleration or deceleration threshold. It is not only much cheaper than the sensor of corresponding function in the system of U.S. Pat. No. 4,060,004, but also more precise in operation. glass tube 60. A casing 70, preferably made of synthetic resin and open on one side, has a cavity 71 in which the glass tube 60 is located. The contacts 61,62, on the one hand, and 63,64 on the other, are connected with leads 72,72 and 74,75, respectively, only one of each pair being visible in FIG. 4 because that is a side view. The electrical leads 72-75 are laid in bent channels 76 in the casing 70. The channels 76 have essentially the same diameter as the leads 72-75 and serve for de-tensioning the connections to the electrodes as well as for preventing the flowing out of the original liquid potting compound with which the casing 70 is filled after the glass tube 60 and the leads 72-75 have been put in place. Mounting holes 77 and 78 are provided for mounting the casing 70 in a vehicle. In the mounting, the angle of lay of the glass tube can be adjusted or corrected.

In the device illustrated in FIG. 4, a pierced diaphragm 79 is mounted, preferably melted into the glass, across the glass tube between the electrodes 61 and 62 on one hand, and the electrodes 63,64 on the other, for setting the deceleration threshold of the device.

Although the invention has been described with reference to particular illustrative embodiments, it will be understood that modifications are possible within the inventive concept.

We claim:

1. A circuit for registering falsely initiated releases of at least one shock-absorbing protective device, in a vehicle, intended to be released into operative position in case of shock-producing accident, comprising, in addition to a first deceleration sensor (12,13) and at least one normally open switch (14,43) operable in response thereto and connected in series with at least one electrically operated shock-absorbing protective device (11,42) for control of the release thereof:
   a second deceleration sensor (52) responsive to a rate of deceleration exceeding a predetermined minimum rate and a normally closed switch (50) operable in response thereto;
   a storage register (49) responsive to a current exceeding a predetermined minimum current connected in a series circuit combination with said normally closed switch (50), said series circuit combination (49,50) being connected in a circuit branch disposed in parallel with said at least one protective device (11,42),
   whereby registration of a current in said storage register (49) exceeding said minimum is indicative of a falsely initiated release of said protective device, by virtue of the failure of said second sensor (52) to open said normally closed switch (50) in response to deceleration before the release of said protective device.

2. A circuit as defined in claim 1, in which said normally closed switch (50) and said second deceleration sensor (52) are combined into a unitary component.

3. A circuit as defined in claim 1, comprising a plurality of shock-absorbing protective devices (11,42) which are respectively connected through decoupling diodes (47,48) with said series circuit containing said storage register (49).

4. A circuit as defined in claim 1, in which an additional normally open switch (45) responsive to said second deceleration sensor (52) is provided and connected in series with said at least one normally open switches (14,43) responsive to said first deceleration sensor (12,13), said switch (45) being bridged by a resistor (44).

5. A circuit as defined in claim 4, in which said second deceleration sensor (52) is connected to said additional normally open switch and said normally closed switch in such a manner that when said second deceleration sensor responds to a rate of deceleration that begins to exceed said predetermined minimum rate, said normally closed switch (50) is first caused to operate and immediately thereafter said additional normally open switch (45) is operated.

6. A circuit as defined in claim 4, in which said additional normally open switch (45), said normally closed switch (50) and said second deceleration sensor are combined into a unitary component.

7. A circuit as defined in claim 6, in which said unitary component comprises a mercury switch having a tubular envelope (60) inclined to the vertical, having two pairs of contacts bridgable by a quantity of mercury (65), each pair of contacts (61,62; 63,64) projecting into said tubular envelope from a closed end thereof, said envelope being mounted so that inertial force exceeding a predetermined value will remove the mercury from a position bridging one pair of contacts and propel it to a position bridging the other pair of contacts.

8. A circuit as defined in claim 7, in which at least a portion of at least one of said pairs of contacts (63,64) is constituted with a platinum contact surface (66,67).

9. A circuit as defined in claim 7, in which said tubular envelope is constricted by pinch-type deformations (68,69) between the respective locations of said contact pairs (61,62; 63,64).

10. A circuit as defined in claim 7, in which said tubular envelope (60) is provided with a pierced diaphragm (79) located between said contact pairs therein.

11. A circuit as defined in claim 7, in which said tubular envelope (60) is embedded in a casing (70) which is open to one side and having channels (76) leading through said casing to the respective ends of said envelope (60) and of a diameter corresponding substantially to the diameter of electrical leads (72-75) to said contacts of said contact pairs.

12. A circuit as defined in claim 1, claim 4 or claim 3, in which said storage register is constituted in the form of a current-operated fuse.

13. A circuit as defined in claim 1, in which there is provided a test circuit (19 to 41) for at least one release circuit (10) controlled by said first deceleration sensor (12,13), said test circuit including a second normally closed switch (16) in series with said at least one normally open switch (14,43) controlled by said sensor (12,13) arranged to be opened when the test program is in progress and arranged so that during the test program a simultaneous closed conditional of said second normally closed switch (16) and one of said at least on switch (14,43) controlled by said sensor (12,13) is prevented, there being also test resistors (17,18; 46) bridging all of the switches (16,14; 43,45) connected in series to said shock-absorbing protective devices (11,42).

* * * * *